United States Patent [19]
Davis et al.

[11] Patent Number: 6,133,378
[45] Date of Patent: Oct. 17, 2000

[54] EPDM-BASED ROOFING SHINGLE COMPOSITIONS

[75] Inventors: James A. Davis, Indianapolis; George G. Furman, Lebanon; Jerry C. Rose, Fishers, all of Ind.

[73] Assignee: Bridgestone/Firestone, Inc., Akron, Ohio

[21] Appl. No.: 09/197,023

[22] Filed: Nov. 20, 1998

[51] Int. Cl.[7] .......................... C08F 210/16; C08F 210/18; C08L 23/00; C08L 23/04

[52] U.S. Cl. .................. 525/240; 525/331.7; 525/331.8; 524/401; 524/405; 524/424; 524/444; 524/445; 524/449; 524/451; 524/481; 524/484; 524/487; 524/497

[58] Field of Search .............................. 525/240, 331.7, 525/331.8; 524/401, 405, 424, 442, 444, 445, 449, 451, 481, 484, 487, 497

[56] References Cited

U.S. PATENT DOCUMENTS

| | | | |
|---|---|---|---|
| 3,345,325 | 10/1967 | Martin . | |
| 4,405,680 | 9/1983 | Hansen . | |
| 4,431,776 | 2/1984 | Honsberg | 525/194 |
| 4,461,875 | 7/1984 | Crepeau | 525/348 |
| 4,666,785 | 5/1987 | Crepeau | 428/521 |
| 5,242,970 | 9/1993 | Davis et al. | 524/492 |
| 5,389,715 | 2/1995 | Davis et al. | 524/505 |
| 5,512,118 | 4/1996 | Davis et al. | 156/157 |

OTHER PUBLICATIONS

*Roof Curable EPDM Flashing Single Ply Membrane Roofing*, Allen E. Crepeau (May 6, 1982).

Primary Examiner—Nathan M. Nutter
Attorney, Agent, or Firm—David G. Burleson; Daniel N. Hall; Rodney L. Skoglund

[57] ABSTRACT

High durometer, polymeric roofing shingles with varying colors and shades of color may be prepared from a composition of matter comprising 100 parts by weight of a ethylene-propylene-diene (EPDM) terpolymer; from 25 to about 400 parts by weight of at least one non-combustible filler per 100 parts of ethylene-propylene-diene (EPDM) terpolymer; from 0 to about 125 parts by weight of at least one combustible filler, per 100 parts of ethylene-propylene-diene (EPDM) terpolymer; from 0 to about 135 parts by weight of a thermoplastic modifying polymer; from 0 to about 10 parts by weight of reinforcing fibers, per 100 parts of ethylene-propylene-diene (EPDM) terpolymer; from about 20 to about 75 parts by weight of a processing oil per 100 parts of ethylene-propylene-diene (EPDM) terpolymer; and from about 1 to about 6 parts by weight of a sulfur cure package having at least two curing accelerators. Fiber reinforced, high durometer, EPDM-based roofing shingles of the present invention are a suitable replacement for traditional slate, wood or asphalt roofing shingles used to cover sloped roofs. A method is further provided for covering sloped roofs comprising applying a plurality of the fiber reinforced, high durometer EPDM-based roofing shingles of the present invention to a sloped roof in a preselected installation pattern.

11 Claims, No Drawings

EPDM-BASED ROOFING SHINGLE COMPOSITIONS

TECHNICAL FIELD OF THE INVENTION

The present invention relates generally to covering elements, preferably for roofs, of the type commonly known as roofing shingles. More particularly, the present invention relates to uncolored and colored, fiber reinforced, high durometer EPDM-based polymeric roofing shingles, having improved heat aging, ozone, oxidation and moisture resistance as compared to traditional asphalt-based roofing shingle compositions. The fiber-reinforced EPDM-based polymeric roofing shingles of the present invention feature virgin and recycled EPDM polymer compositions as well as compositions containing at least 100 parts by weight of recycled EPDM materials.

BACKGROUND OF THE INVENTION

High durometer roofing shingles used to cover sloped roofs are known in the art. Typically, these roofing shingles are used to replace shingles, shakes, or other covering elements made of slate, wood, asphalt, or other hard, natural materials known in the art. These shingles are designed essentially to match the size, shape and texture of the shingle to be replaced, thereby maintaining essentially the same installation pattern, architectural perspective or aesthetic appearance for the roof on which they are placed.

Heretofore, polymer blends of vulcanized scrap rubber or ground rubber and polyolefin resin have consistently been employed to produce these high durometer roof covering elements. For example, U.S. Pat. Nos. 5,312,573 and 5,157,082 refer to processes for the production of useful articles made from reclaimed vulcanized rubber, preferably from tires, and polyolefin resins such as polyethylene or polypropylene. In each instance, the major component of the polymer blend is the inert vulcanized rubber.

More particularly, the inert vulcanized scrap rubber is often reclaimed from recycled tires, as noted hereinabove, or from off-specification rubber compounds available from tire manufacturing facilities or various other industrial facilities. Such rubber typically includes rubber materials such as natural rubber, synthetic polyisoprene, styrene butadiene rubber (SBR), polybutadiene, butyl rubber (IR) or the like or mixtures and blends thereof. While such rubber may be particularly useful for the processes developed in the above-mentioned patents, these rubbers are not easily converted into new products and must oftentimes be employed with additional polymeric ingredients and/or compatibilizers in order to form the articles desired. For example, both patents noted hereinabove require the use of additional thermoplastic resins such as polyethylene and polypropylene, or copolymers thereof.

Ethylene-propylene-diene (EPDM) terpolymers have gained wide acceptance in the construction industry as a suitable material for single-ply EPDM-based roofing membrane or sheeting compositions. To the extent that EPDM may be included in the scrap or ground vulcanized rubber products of the prior art, EPDM has not been used in significant portions and is essentially inert in the scrap rubber compositions, acting, for the most part, as a filler material since the rubber has already been cured. Nevertheless, single-ply EPDM-based roofing membrane or sheeting has rapidly gained acceptance as an effective covering and barrier to prevent the penetration of moisture through industrial and commercial flat roofs. Such EPDM membranes have outstanding weathering resistance, flexibility and low temperature properties. EPDM-based polymeric roofing compositions are normally prepared by vulcanizing or curing it in the presence of sulfur or sulfur-containing compounds, such as mercaptans. The use of EPDM is also advantageous in that it can be easily mixed with other ingredients, such as mineral fillers, processing oils and the like to provide a suitable single-ply polymeric roofing membrane composition. These membranes are typically applied to the roof surface in a vulcanized or cured state, but are flexible enough to be transported in the form of a roll. However, these membranes are not used on sloped roofs, would be difficult to install on sloped roofs, and do not possess the required hardness to be suitable for use on sloped roofs.

Traditional asphalt-based roofing shingles are well known, but typically do not weather well in cold temperatures. These traditional roofing shingles are also somewhat susceptible to damage by hail. Furthermore, it is known that roofing shingles of this type do not provide the heat aging, ozone, oxidation and moisture resistance of roofing membranes employing EPDM terpolymers. Slate roofing shingles, while suitable for most purposes, are very heavy and very expensive in comparison to asphalt or polymeric roofing shingles. Thus, neither of these alternatives, i.e., asphalt or slate roofing shingles are particularly desirable.

Roofing shingles of the type described hereinbelow are generally stiff, and can be molded into flat sheets of essentially any size or shape. Where the roofing shingle to be developed will replace slate or asphalt shingles, it has been found that production of a rectangular roofing shingle which is about 0.25 inches thick, about 18 inches long and about 12 inches wide, is desirable. It will be appreciated, however, that other sizes and shapes may be more suitable and preferred when used to replace shingles of other types or when the slate or asphaltbased shingles being replaced are not of that same general size or shape, and the present invention should not be limited thereto.

Accordingly, it is believed desirable to develop low cost, high durometer polymeric roofing shingles to replace traditional shingles, shakes or other covering elements made of slate, wood, asphalt, and the like. The roofing shingles should also impart improved burn resistivity, weathering resistance, stress-strain properties, die-C tear characteristics, Shore "A" hardness and protective properties over the traditional roofing shingles used to cover sloped roofs.

The resulting roofing shingle compositions of the present invention are seen as being useful to the manufacture of high durometer roofing shingles, suitable as a replacement for traditional roofing shingles used to cover sloped roofs, where aesthetic appearance, improved burn resistivity, resistant to hail and wind damage and weathering performance are some of the more desirable characteristics of roofing shingles.

SUMMARY OF THE INVENTION

It is, therefore, an object of the present invention to provide a high durometer polymeric roofing shingle suitable for covering sloped roofs.

It is another object of the present invention to provide a high durometer, polymeric roofing shingle, as above, which comprises ethylenepropylene-diene (EPDM) terpolymer as the polymeric component of the roofing shingle.

It is still another object of the present invention to provide a high durometer, EPDM-based roofing shingle, as above, which further comprises reinforcing fibers or filaments.

It is yet another object of the present invention to provide a high durometer, EPDM-based roofing shingle, as above, which is sulfur curable.

It is still a further object of the present invention to provide a high durometer, EPDM-based roofing shingle, as above, which comprises an EPDM rubber dust to impart color to the roofing shingle composition.

It is a further object of the present invention to provide a polymeric roofing shingle, as above, which comprises 100 weight percent recycled EPDM as the polymeric component of the roofing shingle.

It is yet a further object of the present invention to provide a polymeric roofing shingle, as above, which is composed entirely of recycled material.

It is still a further object of the present invention to provide a polymeric roofing shingle, as above, optionally comprising mineral fillers and fire retardant additives. It is yet a further object of the present invention to provide a polymeric roofing shingle, as above, having improved heat aging, ozone, oxidation and moisture resistance as compared to traditional roofing shingles made of asphalt.

It is still a further object of the present invention to provide a polymeric roofing shingle, as above, having improved stress-strain properties, die C tear resistance and Shore "A" hardness as compared to traditional roofing shingles made of asphalt.

It is yet another object of the present invention to provide a polymeric roofing shingle, as above, having an increased stiffness (i.e., more resistant to wind uplift) as compared to traditional roofing shingles made of asphalt.

It is still another object of the present invention to provide a polymeric roofing shingle, as above, having improved burn resistivity as compared to traditional roofing shingles made of asphalt.

It is yet a further object of the present invention to provide a polymeric roofing shingle, as above, having an improved low temperature performance as compared to traditional roofing shingles made of asphalt.

It is still a further object of the present invention to provide a polymeric roofing shingle, as above, having an improved resistance to hail damage as compared to traditional roofing shingles made of asphalt.

It is yet a further object of the present invention to provide a method for covering sloped roofs using the rubber roofing shingle described herein.

At least one or more of the foregoing objects, together with the advantages thereof over the known art relating to roofing shingle compositions, which shall become apparent from the specification which follows, are accomplished by the invention as hereinafter described and claimed.

In general, the present invention provides, a normal colored i.e., dark gray or black, or a uniquely colored, e.g., red, green, tan, etc., high durometer ethylene-propylene-diene (EPDM) roofing shingles comprising 100 parts by weight of an amorphous, sulfur-curable, ethylene-propylene-diene (EPDM) terpolymer, having a crystallinity of less than about 1.5 percent, as the polymeric component, from about 20 to about 135 parts by weight of at least one thermoplastic modifying polymer per 100 parts of the ethylene-propylene-diene (EPDM) terpolymer, from about 25 to about 400 parts by weight of a non-combustible filler, per 100 parts of ethylene-propylene-diene (EPDM) terpolymer, from 0 to about 125 parts by weight of a combustible filler, per 100 parts of the ethylene-propylene-diene (EPDM) terpolymer; from 0 to about 20 part by weight of reinforcing glass fibers per 100 parts of the ethylene-propylene-diene (EPDM) terpolymer, from 20 to about 75 parts by weight of a processing oil per 100 parts of the ethylene-propylene-diene (EPDM) terpolymer, from about 1 to about 6 weight percent of a sulfur cure package per 100 parts of the ethylene-propylene-diene (EPDM) terpolymer, and optionally from 0 to about 150 parts by weight of a colored EPDM rubber dust per 100 parts of the ethylene-propylene-diene (EPDM) terpolymer. The acceptable roofing shingles of the present invention may be manufactured using 100 percent recycled EPDM-based composition. These recycled compositions include a mixture of uncured roof shingle edge trimmings and/or cured flashing trimmed from the edges of compression molded EPDM-based roofing shingles.

The present invention also provides a method for covering sloped roofs comprising: applying a plurality of the normal colored or uniquely colored, fiber-reinforced, high durometer roofing shingles of the present invention to a sloped roof in a preselected installation pattern, the roofing shingles being prepared from a composition of matter comprising 100 parts by weight of an amorphous, sulfurcurable, ethylene-propylene-diene (EPDM) terpolymer, having a crystallinity of less than about 1.5 percent, as the polymeric component, from about 20 to about 135 parts by weight of at least one thermoplastic modifying polymer per 100 parts of the ethylene-propylene-diene (EPDM) terpolymer, from about 25 to about 400 parts by weight of at least one non-combustible filler, per 100 parts of the ethylenepropylene-diene (EPDM) terpolymer, from 0 to about 125 parts by weight of a combustible filler, per 100 parts of the ethylene-propylene-diene (EPDM) terpolymer, from 0 to about 20 part by weight of reinforcing fibers per 100 parts of the ethylene-propylene-diene (EPDM) terpolymer, from 20 to about 75 parts by weight of a compatible processing oil, per 100 parts of the ethylene-propylene-diene (EPDM) terpolymer, from about 1 to about 6 weight percent of a sulfur cure package per 100 parts of the ethylene-propylene-diene (EPDM) terpolymer, and optionally from 0 to about 150 parts by weight of a colored EPDM rubber dust per 100 parts of the ethylene-propylene-diene (EPDM) terpolymer.

DETAILED DESCRIPTION OF THE INVENTION

As described hereinabove, the roofing shingle compositions of the present invention comprises an ethylene-propylene-diene terpolymer as the rubber component. The term EPDM is used in the sense of its definition as found in ASTM D-1418-94 and is intended to mean a terpolymer of ethylene, propylene and a diene monomer. Although not to be limited thereto, illustrative methods for preparing such terpolymers are found in U.S. Pat. No. 3,280,082, the disclosure of which is incorporated herein by reference. Other illustrative methods can be found, for example, in *Rubber and Chemistry & Technology,* Vol. 45, No. 1, Division of Rubber Chemistry (March 1992); Morton, *Rubber Technology,* 2d ed., Chapter 9, Van Nostrand Reinhold Company, New York (1973); *Polymer Chemistry of Synthetic Elastomers, Part II, High Polymer Series,* Vol. 23, Chapter 7, John Wiley & Sons, Inc. New York (1969); *Encyclopedia of Polymer Science and Technology,* Vol. 6, pp. 367–68, Interface Publishers, a division of John Wiley & Sons, Inc., New York (1967); *Encyclopedia of Polymer Science and Technology,* Vol. 5, p. 494, Interface Publishers, a division of John Wiley & Sons, Inc., New York (1966); and *Synthetic Rubber Manual,* 8th ed., International Institute of Synthetic Rubber Producers, Inc. (1980).

The preferred EPDM terpolymers of the present invention are substantially amorphous. That is, the EPDM terpolymer comprising the rubber component of the roofing shingles of the present invention should have less than about 1.5 percent crystallinity. More particularly, the EPDM roofing shingle composition of the present invention should have 100 parts by weight of an amorphous EPDM containing up to about 1.5 percent crystallinity, and more preferably, up to about 1.1 percent crystallinity.

Any EPDM containing less than 1.5 percent, crystallinity from the ethylene component and exhibiting the properties discussed hereinbelow should be suitable for use in the present invention. Typically, amorphous EPDMs having less than about 68 weight percent ethylene and from about 1.5 to about 4 weight percent of the third monomer (diene portion) with the balance of the terpolymer being propylene or some other similar olefin type polymer is desired. Such EPDMs also preferably exhibit a Mooney viscosity (ML/1+4 at 125° C.) of about 40 to 65 and more preferably, of about 45 to 55. Preferably, the EPDM does not have more than about 4 weight percent, and more preferably, not less than 2 weight percent, unsaturation.

Typical EPDM terpolymers having less than 1.5 percent crystallinity are available from Uniroyal Chemical Co. under the tradename Royalene®. The most preferred EPDM terpolymer is an amorphous EPDM terpolymer having a Mooney Viscosity (ME/1+4 at 125° C.) of about 47, an ethylene content of about 69 weight percent, about 2.7 weight percent unsaturation, and less than 1.5 percent crystallinity. Another preferred amorphous EPDM terpolymer is commercially available from DSM Copolymer under the trademark Keltan® and has a Mooney Viscosity (ML/1+4 at 125° C.) of about 50, an ethylene content of about 69 weight percent, about 2.6 weight percent unsaturation, less than 1.5 percent crystallinity and a specific gravity of about 0.87 at 23° C. Yet another polymer having utility as the base polymer in the roof shingle composition is available as a developmental EPDM polymer produced by Exxon Chemical Company under the trademark Vistalon®. This EPDM terpolymer has a Mooney Viscosity (ML/1+4 at 125° C.) of about 52, an ethylene content of about 69 weight percent, about 2.9 weight percent unsaturation and less than 1.5 percent crystallinity. In this invention, amorphous EPDM terpolymers are preferred over more crystallinity EPDM terpolymers.

The diene monomer utilized in forming the EPDM terpolymer is preferably a non-conjugated diene. Illustrative examples of non-conjugated dienes which may be employed are dicyclopentadiene, alkyldicyclopentadiene, 1,4-pentadiene, 1,4-hexadiene, 1,5-hexadiene, 1,4-heptadiene, 2-methyl-1,5-hexadiene, cyclooctadiene, 1,4-octadiene, 1,7-octadiene, 5-ethylidene-2-norbornene, 5-npropylidene-2-norbornene, 5-(2-methyl-2-butenyl)-2-norbornene and the like.

It will be appreciated that the subject roofing shingles may comprise 100 parts by weight of an amphorous EPDM as the sole elastomeric polymer for the roof shingle composition. However, it is contemplated that more than one EPDM having less than 2 weight percent crystallinity may be employed. For example, roof shingles of the present invention may include a flame retardant package which includes an amorphous EPDM as the polymer binder as well as the amorphous EPDM polymeric component. As more specifically detailed hereinbelow, flame retardant packages commercially available from Great Lakes Chemical Corporation (formerly Anzon Chemical Company) under the tradename Fyrebloc, include from about 10 to 20 percent by weight EPDM and, more preferably, from about 15 to about 17.5 percent by weight EPDM, as the polymeric binder for the total flame retardant package. Thus, the amount of EPDM employed includes the EPDM from the flame retardant package as well as that which is directly compounded in the roof shingle composition as virgin EPDM terpolymer. It will also be noted that certain fillers such as cryogenically or ambiently ground EPDM rubber may include EPDM terpolymers. However, because these fillers do not contain virgin EPDM terpolymers, they have not been figured in the calculation of parts or percentages employed.

When EPDM terpolymers having more than 2 percent crystallinity from the ethylene component are employed, these EPDMs preferably should contain at least about 65 weight percent ethylene and from about 2 to about 4 weight percent unsaturation (diene monomer) with the balance of the terpolymer being propylene or some other similar olefin type polymer. Although not necessarily limiting, the Mooney viscosity of such EPDMs should be no more than about 60 and should have less than about 3.5 weight percent unsaturation. However, EPDMs with Mooney viscosities of about 45 to about 50 are preferred. Non-conjugated dienes like those exemplified above can also be used for these types of EPDMs as well. It will be appreciated, however, that the total EPDM terpolymers utilized will be characterized as having 2 percent or less crystallinity.

As noted hereinabove, at least one impact modifying polymer selected from the group consisting of polyolefin resins or copolymers thereof may be blended with the EPDM to form the polymeric component of the EPDM-based shingle composition. By the term "impact modifying polymer" it is meant that these polymers provide the roofing shingle composition with more stiffness and may increase the impact strength of the composition. Higher shingle stiffness also increases resistance to wind uplift. Essentially any polyolefin resin or copolymer thereof capable of imparting the characteristics described hereinabove may be suitable for the roofing shingle composition of the present invention. Preferably, 0 to about 135 percent by weight of the roofing composition may be made from these impact modifying polymers, per 100 parts EPDM terpolymer. Most preferred, with respect to the polyolefin resins, are low density polyethylene (LDPE), linear low density polyethylene (LLDPE), high density polyethylene (HDPE), and atactic and isostatic polypropylene. Suitable copolymers include, but are not necessarily limited to, ethylene-propylene copolymers, ethylene-butene copolymers, and ethylene-octene copolymers. Generally, the preferred polyolefin resins and copolymers thereof should provide high impact strength and better resistance to wind uplift to the resultant roofing shingle composition.

One particularly useful polyolefin resin is LDPE 722 M, a low density polyethylene commercially available from Dow Plastics. LDPE 722 M has a melt flow index of 8 grams/10 minutes, peak melt temperature of 112° C. as determined by DSC and a specific gravity of 0.9160 g/cc at 23° C. Differential scanning calorimetry (DSC) is used to measure the emission or consumption of heat accompanying a physical change or a chemical reaction as a function of temperature or time in the range of −150° C. to 725° C.

Also of particular use are certain LLDPEs, which may also be considered ethylene-octene copolymers, such as are available from Dow Plastics under the tradename Dowlex®. There are a variety of Dowlex ethylene-octene copolymers which generally differ in their peak melt temperatures and specific gravities. For example, Dowlex 2027 has a peak melt temperature of 113° C. as determined by DSC and a specific gravity of 0.941 g/cc at room temperature whereas Dowlex 2038 and Dowlex 2045 have peak melt temperatures of 127° C. and 124° C., respectively, and specific gravities of 0.935 g/cc and 0.920 g/cc, respectively.

A preferred HDPE resin is Nova 79 G produced by NOVA Chemical Ltd. This resin has a peak melt temperature of 132° C. and a specific gravity of about 0.96 g/cc at 23° C. Another suitable HDPE is 62013 commercially available from Dow Plastics. HDPE 62013 has a peak melt temperature of 131° C. and a specific gravity of 0.945 g/cc at 23° C.

Other resins which may have utility in this invention include a number of HDPE resins produced by Dow Plastics. Some of the typical properties of these resins are shown in Table A hereinbelow.

TABLE A

Comparison of Suitable High Density Polyethylene (HDPE) Resins

| TRADENAME | MELT INDEX (MI) (GRAMS/10 MINUTES) | SPECIFIC GRAVITY (GRAMS/CC) |
| --- | --- | --- |
| 04352N | 4 | 0.952 |
| 06153C | 6.3 | 0.953 |
| 08254N | 7 | 0.954 |
| 10062N | 10 | 0.962 |
| 12350N | 12 | 0.960 |
| 17350N | 17 | 0.950 |
| 25355N | 25 | 0.955 |
| 30360M | 30 | 0.960 |
| 40360M | 38 | 0.958 |

Also preferred are ethylene-propylene copolymers (EPMs) such as those available from Exxon Chemical Company under the registered tradename Vistalon® and DSM Copolymer under the registered tradename Keltan®. The term EPM is used in the sense of its definition as found in ASTM D-1418-94 and is intended to mean a copolymer of ethylene and propylene. Some typical properties of ethylene-propylene copolymers include having an ethylene content of from about 45 percent to about 72 percent by weight, a Mooney viscosity (ML/4 at 125° C.) of from about 25 to 55, a glass transition temperature of from about 40° C. to about −60° C. Ethylene-propylene copolymers are without any unsaturation, and these polymers have excellent long-term heat and ozone aging resistance as well as provide a smooth appearance to the molded shingle. A typical EPM suitable for use in the present invention is available from DSM Copolymer under the tradename Keltan®740. This EPM has a Mooney viscosity (ML/4 at 125° C.) of about 63 and an ethylene content of about 60 weight percent.

Other EPMs are also suitable. For instance, Keltan® 3300A and 4200A have Mooney viscosities (ML/1+4 at 125° C.) of about 35 and about 40, respectively, while Vistalon® 808 and 878 have Mooney viscosities (ML/1+4 at 125° C.) of about 46 and 53, respectively. These ethylene-propylene copolymers are available in dense or semi-friable bales.

Yet another suitable copolymer of propylene and ethylene is Pro-Fax SR549M produced by Montell. This resin has a peak melt temperature of 162° C., a 11–15 melt index range, an izod range at 23° C. from about 1.5 to 2, and a specific gravity of about 0.95 g/cc at 23° C.

Other suitable copolymers include those saturated ethylene-octene copolymers which provide excellent weatherability and are available from Dow Plastics under the tradename Engage. For example, Engage® 8100 and Engage® 8200 have octene contents of about 24 and 25 weight percent, respectively. These general purpose elastomers have Mooney viscosities (ML/1+4 at 121° C.) ranging from 23 to 35 and specific gravities of about 0.87 g/cc at 23° C.

Where these polyolefin resins and copolymers thereof are blended with the EPDM of the roof shingle composition, the polymer blend to be employed in the shingle composition generally includes major amounts of EPDM and only minor amounts of the impact modifying polymer(s). In fact, the polymer blend typically includes at least 100 parts by weight EPDM and up to about 135 parts by weight of an impact modifying polymer, based upon the weight of the EPDM. While more than one impact modifying polymer may be used, the total amount of all these types of polymers combined should not exceed the amount of EPDM (including cryogenically or ambiently ground EPDM rubber and virgin EPDM used as the polymeric binder in the flame retardants and the like) provided.

In addition to the EPDM terpolymers and the impact modifying polymers such as the polyolefin resins and copolymers thereof, as discussed hereinabove, the roofing shingle composition of the present invention may also include fillers, processing aids and curatives as well as other optional components including activators and flame retardant packages, all of which are discussed hereinbelow. The amounts of fillers, processing materials, curing agents, and other additives used in the roofing shingle composition will be expressed hereinafter as parts by weight per 100 parts by weight EPDM terpolymer, since EPDM is the base component of the roof shingle composition. Accordingly, where the term "phr" is used, it will be understood to mean parts by weight per 100 parts by weight virgin EPDM terpolymer, even if an additional impact modifying polymer is employed.

With respect to the fillers, suitable fillers are selected from the group consisting of combustible and non-combustible materials. Generally, these materials can be added to the formulation in amounts ranging from about 25 to about 525 parts by weight, per 100 parts virgin EPDM terpolymer.

With respect to combustible materials, there are many types of materials which can be used as combustible fillers for the roofing shingle composition of the present invention. However, in the preferred embodiment, it is desired to keep the amount of combustible material as low as possible, and to particularly keep the amount of carbon black as low as possible. In this respect, it is preferred that no virgin carbon black be employed in the present invention. One particularly useful and preferred combustible material is cryogenically ground EPDM rubber. Essentially any cryogenically or ambiently ground EPDM rubber may be employed as a filler in the roofing shingle composition. Preferred cryogenically or ambiently ground rubbers are cryogenically or ambiently ground EPDM-based rubbers. The preferred ground EPDM rubber is a fine black rubbery powder having a specific gravity of about 1.16±0.015 g/cc and a particle size ranging from about 30 to about 300 microns with an average particle size ranging from about 40 to about 80 microns. In the absence of any carbon black, the amount of cryogenically or ambiently ground rubber may be somewhat high, from about 0 to about 125 parts by weight per 100 parts virgin EPDM terpolymer (phr). It has been found that these ground rubbers provide significant reductions to the cost of the composition while maintaining the desired properties of the composition, since the ground rubber is essentially inert.

Also particularly useful and preferred with respect to non-combustible materials are non-black mineral fillers. These mineral fillers are essentially inorganic materials which generally aid in reinforcement, heat aging resistance, green strength performance, and flame resistance. There are a number of different inorganic materials that fall into this category of fillers. For example, these mineral fillers include a number of different types of clays, including hard clays, soft clays, chemically modified clays, water-washed clays, and calcined clays. Other examples of mineral fillers suitable for use in the present invention include mica, talc, alumina trihydrate, antimony trioxide, calcium carbonate, titanium dioxide, silica, slate dust and certain mixtures thereof. Still other inorganics such as magnesium hydroxide and calcium borate ore may also be employed. In the preferred embodiment, these fillers completely replace "black" fillers, i.e. carbon black and other petroleum-derived materials. Generally, however, one or more of these mineral fillers are employed in amounts ranging from about 25 parts to about 400 parts by weight, per 100 parts EPDM terpolymer.

Any of four basic types of clays are normally used as fillers for rubber elastomers. The different types of clay fillers include airfloated, water washed, calcined and surface treated or chemically modified clays.

The airfloated clays are the least expensive and most widely used. They are divided into two general groups, hard and soft, and offer a wide range of reinforcement and loading possibilities. Hard Clays may be used in the amount of about 20 parts to about 300 parts per 100 parts EPDM (phr), preferably in an amount from about 65 to 210 phr. Preferred airfloated hard clays are commercially available from J. M. Huber Corporation under the tradenames Barden R®; and LGBO from Kentucky-Tennessee Clay Company, Koalin Division, Sandersville, Ga., under the tradename Suprex®.

The airfloated soft clays may be used in amounts ranging from about 20 parts to about 300 parts per 100 parts of EPDM (phr), preferably in an amount from about 75 to 235 phr. The preferred airfloated soft clays are available from J. M. Huber Corporation under the tradename K-78®, from Evans Clay Company under the tradename Hi-White Re and from Kentucky-Tennessee Clay Company, Koalin Division, Sandersville, Ga., under the tradename Paragon®. Particularly preferred is Hi-White R®, an air-floated soft clay characterized as having a pH of about 6.25±1.25, an oil absorption of 33 grams/100 grams of clay, a average particle size of less than two microns and a specific gravity of about 2.58 g/cc.

Water washed clays are normally considered as semi-reinforcing fillers. This particular class of clays is more closely controlled for particle size by the water-fractionation process. This process permits the production of clays within controlled particle size ranges. The preferred amounts of water washed clays are very similar to the preferred amounts of airfloated soft clays mentioned hereinabove. Some of the preferred water washed clays include Polyfil® DL, Polyfil® F, Polyfil® FB, Polyfil® HG-90, Polyfil® K and Polyfil® XB; all commercially available from J. M. Huber Corporation.

The third type of clay includes the calcined clay. Clays normally contain approximately 14 percent water of hydration, and most of this can be removed by calcination. The amount of bound water removed determines the degree of calcination. The preferred ranges of calcined clays are very similar to the preferred amounts of airfloated hard clays mentioned hereinabove. Some of the preferred calcined clays include Polyfil® 40, Polyfil® 70, and Polyfil® 80, all commercially available from J. M Huber Corporation.

The last type of clay includes chemically modified reinforcing clays. Cross-linking ability is imparted to the clay by modifying the surface of the individual particles with a polyfunctional silane coupling agent. Chemically modified clays are used in the amount of from about 20 parts to about 300 parts per 100 parts EPDM (phr), preferably in an amount from about 60 to 175 phr. Normally, the specific gravity of most of these clays is about 2.60 at 25° C. The preferred chemically modified clays are commercially available from J. M. Huber Corporation and include those available under the tradenames Nucap®, Nulok® and Polyfil®. Other preferred chemically modified clays are commercially available from Kentucky-Tennessee Clay Company under the tradenames Mercap® 100 and Mercap® 200.

As an alternative to the clays, a silicate may have utility in the present invention. For example, synthetic amorphous calcium silicates such as those which are commercially available from the J. M. Huber Company under the tradename Hubersorb® may be utilized. One particular silicate, Hubersorb® 600, is characterized as having an average particle size of 3.2 micrometers (by the Coulter Counter Method), oil absorption of 450 ml/100 grams of calcium silicate, a BET (BrunaverEmmet-Teller nitrogen adsorption procedure) surface area of 300 and a pH (5% solution) of about 10.

Other silicates which may be used in the composition of the present invention include precipitated, amorphous sodium aluminosilicate available from the J. M. Huber Company under the tradename Zeolex 23® has a BET surface area of about 75 $m^2$/gram, a refractive index at 20° C. of about 1.51, and a pH of about 10.2 determined by slurring 20 grams of silicate with 80 grams of deionized water. In comparison, Zeolex® 80 has a BET surface area of about 115 $m^2$/gram, a refractive index at 20° C. of about 1.55, and a pH of about 7. The average particle size, density, physical form and oil absorption properties are similar to each other.

Reinforcing silicas may also be used as non-combustible fillers, preferably in conjunction with one or more of the chemically modified clays noted hereinabove. Silica (silicon dioxide) utilizes the element silicon and combines it in a very stable way with two oxygen atoms. Generally, silicas are classed as wet-processed, hydrated silicas because they are produced by a chemical reaction in water, from which they are precipitated as ultrafine, spherical particles. However, there are in reality two different forms of silica, crystalline and amorphous (noncrystalline). The basic crystalline form of silica is quartz, although there are two other crystalline forms of silica that are less common—tridymite and cristobalite. On the other hand, the silicon and oxygen atoms can be arranged in an irregular form as can be identified by X-ray diffraction. This form of silica is classified as amorphous (noncrystalline), because there is no detectable crystalline silica as determined by X-ray diffraction. The most preferred forms of silica, i.e., a fine particle, hydrated amorphous silica, are available from PPG Industries, Inc. and J. M. Huber Corporation in a low dust granular form. these silicas typically are available from PPG Industries under the tradenames HiSil® and Silene®. Reinforcing silicas are generally characterized in terms of surface area ($m^2$/gram by the BET procedure) or particle size as determined by either electron microscopy or the Coulter Counter Method.

These silicas can be employed in the amount of about 10 parts to about 110 parts per 100 parts virgin EPDM terpolymer (phr), preferably in an amount from about 10 to 30 phr. The useful upper range is limited by the high viscosity imparted by fillers of this type.

Still other fillers include calcium carbonate, titanium dioxide, talc (magnesium silicate), mica (mixtures of sodium and potassium aluminum silicate), alumina trihydrate, antimony trioxide, magnesium hydroxide, and calcium borate ore. The amount of these fillers may vary significantly depending upon the number and amount of other particular fillers employed, but typically are employed in amounts ranging from about 25 to about 250 parts by weight, per 100 parts virgin EPDM terpolymer. The most preferred of these mineral fillers include 100 percent magnesium hydroxide (200 parts or less), or mixtures of magnesium hydroxide (less than 100 parts) in combination with alumina trihydrate (less than 100 parts) and mistron vapor talc (less than 50 parts). Parts expressed as parts per 100 parts virgin EPDM terpolymer are by weight, unless otherwise indicated.

One particularly useful form of talc is Mistron Vapor Talc (MVT) commercially available from Luzenac America, Inc. Mistron Vapor Talc (MVT) is a soft, ultra-fine, white platy powder having a specific gravity of 2.75 g/cc. Chemically, Mistron Vapor Talc is ground magnesium silicate having a median particles size of 1.7 microns, an average surface area of about 18 m$^2$/gram and a bulk density (tapped) of 20 lbs/ft$^3$.

Alumina trihydrate is a finely divided, odorless, crystalline, white powder having the chemical formula $Al_2O_3 \cdot 3H_2O$. Alumina trihydrate is utilized in the present invention to enhance the green strength of the EPDM terpolymer or the other polyolefins. Preferably, alumina trihydrate has an average particle size ranging from about 0.1 micron to about 5 microns, and more preferably, from about 0.5 micron to about 2.5 microns.

A preferred ground alumina trihydrate for use with the invention is designated H-15 (ATH-15), and has a specific gravity of about 2.42 g/cc, and an ash content of about 64–65 weight percent. ATH-15 is commercially available from Franklin Industrial Minerals, of Dalton, Ga. Other alumina trihydrates produced by Franklin Industrial Minerals which are believed to have utility in this invention include those designated H-100, H-105, H-109 and H-990. Alumina trihydrate can also be advantageously used as a flame retardant and smoke suppressant in the EPDM-based roof shingle composition of the present invention.

Other sources of alumina trihydrates are Micral 1000 and Micral 1500, available from J. M. Huber Corporation, Engineered Minerals Division, of Norcross, Ga., which have a median particle size of about 1.1 microns and 1.5 microns, respectively. Both alumina trihydrates have a specific gravity of about 2.42 g/cc, an ash content of about 64–65 weight percent and a loss on ignition (LOI) at 1000° F. of about 34.65 weight percent. Other alumina trihydrates produced by this corporation which are believed to have utility in this invention include those designated as Micral 932 and Micral 532 as well as superfine alumina trihydrates including SB-632 and SB-805.

Another particularly useful mineral filler is the ore of calcium borate. This filler is available in various particle size grades from American Borate Company, Virginia Beach, Va., under the tradename Colemanite® and has the chemical formula $Ca_2B_6O_{11} \cdot 5H_2O$. Colemanite has a specific gravity of about 2.4 g/cc. This ore has an average particle size of about 0.1 to about 5 microns, and more preferably, from about 0.5 micron to about 2.5 microns.

Still another mineral filler which may be particularly suitable for use in the roofing shingle composition of the present invention is magnesium hydroxide. Magnesium hydroxide $(Mg(OH)_2)$ is a finely divided, white powder which is an extremely effective smoke suppressant as well as a flame retardant additive. It is well documented that (Mg(OH)$_2$) is highly effective in reducing smoke. Thus, this mineral filler is believed to be particularly useful where smoke and fire resistivity is a concern. To that end, this mineral filler often times will replace other mineral fillers such as silica or some of the clays in the roof shingle composition.

Commercial grades of magnesium hydroxide are available from Martin Marietta Magnesia Specialties, Inc. under the tradename MagShield. MagShield S is a magnesium hydroxide with a mean particle size of about 6.9 microns. MagShield M has a mean size of about 1.9 microns. Both of these grades of magnesium hydroxide are about 98.5 percent pure, have about 0.3 percent loss on drying and about 30.9 percent by weight loss on ignition, and a specific gravity of about 2.38 g/cc at 23° C.

Clay, titanium dioxide, alumina trihydrate, magnesium hydroxide, talc and mica can also be used to develop a gray colored or slate-like colored roofing shingle. The desirable gray color may be obtained through the use of different combinations of non-combustible mineral fillers.

The present invention may further utilize up to about 150 parts by weight, per 100 parts EPDM terpolymer, ground EPDM-based rubber dust (20 mesh) in developing uniquely colored EPDM-based roofing shingle compositions. It will be appreciated that, by the term "uniquely colored", it is meant that the compositions are of a color other than those colors commonly associated with shingles, i.e., dark gray or black. Such slate-colored or dark gray shingle compositions have been referred to as "normal colored" shingle compositions. The finely ground EPDM-based rubber dust is available in various colors, i.e., green, red, purple, tan, blue, orange, etc. The EPDM polymer content on the ground rubber dust was found to be about 20 weight percent according to thermal analysis data. The specific gravity of the colored rubber dust was determined to be 1.568 g/cc. The colored rubber dust has been screened to 20 mesh, packaged in 23 kg polybags and is commercially available from Goldsmith & Eggleton, Wadsworth, Ohio 44281.

The roofing shingle composition of the present invention may also contain one or more processing materials. Processing materials are generally included to improve the processing behavior of the roof shingle composition (i. e. to reduce mixing time and to increase the rate of compound throughout) and includes processing oils, waxes and other similar additives. A process oil may be included in an amount ranging from about 20 parts to about 75 parts process oil per 100 parts EPDM terpolymer (phr), preferably in an amount ranging from about 40 phr to about 60 phr. A preferred processing oil is a parafrmic oil, e.g. Sunpar 2280, which is available from the Sun Oil Company. Also, Hyprene P150BS from Ergon, Inc., has utility in this invention. Other petroleum derived oils including naphthenic oils are also usefiul. Liquid halogenated paraffins may serve as softeners or extenders and are also often desirable as flame retardant additives.

A preferred liquid chlorinated paraffin is Doverguard 5761, which features about 59 weight percent chlorine and can be used both as a softener as well as a fire retardant additive. This liquid paraffin has a viscosity of about 20 poise at 25° C. and a specific gravity of about 1.335 gm/cc at 23° C. Another liquid paraffin having utility in this invention is a liquid bromochlorinated paraffin flame retardant additive, i.e., Doverguard 8207A having 30 and 29 weight percent bromine and chlorine, respectively. Doverguard 8207A has a specific gravity of about 1.42 gm/cc at 50° C. Both liquid halogenated paraffins are commercially available from Dover Chemical Corporation, a subsidiary of ICC Industries, Inc.

A homogenizing agent may also be added, generally in an amount of less than 10 parts by weight, more preferably, in an amount of about 2 to 5 parts by weight, and most preferably 2.5 parts by weight, per 100 parts EPDM terpolymer. One particularly suitable homogenizing agent is available in both flake and pastille form from Struktol Company under the tradename Struktol 40 MS. The preferred homogenizing agent is composed of a mixture of dark brown aromatic hydrocarbon resins having a specific gravity of about 1.06 g/cc at 23° C.

A fire retardant package may also be added to the composition where increased fire resistance is desired. There are a variety of fire retardant packages commercially available for use with rubber compositions. Generally, the flame retardant system incorporated in the roof shingle composition can be made of different types of materials including ratios of decabromodiphenyl oxide (DBDPO) or related bromine containing additives and antimony trioxide. Various inorganic materials, clay, alumina trihydrate, magnesium hydroxide, silica, mica, talc and zinc carbonate can be used as part of the filler system as well as flame retardant additives. Certain halogenated paraffins can be used as the softener or extender and still impart flame resistance to the roof shingle composition.

One particularly useful fire retardant package is available from Great Lakes Chemical Corporation. This fire retardant package is 85 percent active and contains 15 percent by weight EPDM terpolymer as a polymeric binder for the package. The package also includes a mixture of antimony trioxide and decabromodiphenyl oxide. Another useful fire retardant package is also available from Great Lakes Chemical Corporation, and is 82.5 percent active. The fire retardant package contains 17.5 percent by weight EPDM as the polymeric binder. Zinc borate, decabromodiphenyl oxide and antimony trioxide are further included in the package. It will be appreciated that, where used, these packages are employed in amounts ranging from about 40 to 70 parts by weight, per 100 parts EPDM. As discussed hereinabove, it will also be appreciated that these fire retardant packages may contain a portion of the virgin EPDM terpolymer employed in the roof shingle composition. The above fire retardant packages were formerly produced by Anzon Chemical Company.

The present invention may also include reinforcing fibers to increase the stiffness of the cured EPDM-based roofing shingle composition. Preferably, these reinforcing fibers are chopped fibers or filaments selected from the group consisting of fiberglass, polyester, polyamide, polyolefin and mixtures thereof. Fiberglass fibers appear to be the most preferred for the particular roofing shingles of the present invention. When used, amounts up to about 20 parts by weight per 100 parts EPDM are preferred. In a preferred embodiment, reinforcing glass fibers are about 4 millimeters in chop length and have a filament diameter of about 14 microns. Any chopped fibers of about 12 millimeters in length or less are preferred, however. Moreover, other synthetic fibers, e.g., polyester, nylon, rayon, and Kevlar (aramid) can be used in this invention, however glass fiber is preferred. Fibers with a filament diameter of about 25 microns or less are preferred in this invention. Often times, rubber-to-fiber adhesion can be improved by chemically treating the surface of the individual fibers. The samples of chop glass fiber evaluated in this invention are commercially available from Owens Corning, and have been found to uniformly disburse well in the composition.

The roofing shingle composition may also include a cure package containing sulfur and at least one sulfur vulcanizing accelerator in order to effect full cross-linking or vulcanizing of the composition prior to its use on a roof. The composition is typically vulcanized for a period of time at an elevated temperature to insure sulfur crosslinking. The polymeric composition may be cured using any of several well-known curing agents, but preferably the cure package of the present invention includes sulfur and one or more sulfur vulcanizing accelerators.

Generally, the sulfur/accelerator cure package employed in the roof shingle composition of the present invention is provided in amounts ranging from about 1.5 to about 10 phr, depending upon the amount of sulfur utilized.

As noted, the sulfur and sulfur-containing cure systems used in the present invention typically include one or more sulfur vulcanizing accelerators. Suitable accelerators commonly employed include, for example, thioureas such as ethylene thiourea, N,N-dibutylthiourea, N,N-diethylthiourea and the like; thiuran monosulfides and disulfides such as tetramethylthiuram monosulfide (TMTMS), tetrabutylthiuram disulfide (TBTDS), tetramethylthiuram disulfide (TMTDIS), tetraethylthiuram monosulfide (TETMS), dipentamethylenethiuram hexasulfide (DPTH) and the like; benzothiazole sulfenamides such as N-oxydiethylene-2-benzothiazole sulfenamide, Ncyclohexyl-2-benzothiazole sulfenamide, N,N-diisopropyl-2-benzothiazole sulfenamide, N-tert-butyl-2-benzothiazole sulfenamide (TBBS) and the like; other thiazole accelerators such as Captax (MBT) or Altax (MBTS), 2-mercaptoimidazoline, N,N-diphenylguanadine, N,N-di-(2-methylphenyl)-guanadine, 2-mercaptobenzothiazole, 2-(morpholinodithio) benzothiazole disulfide, zinc 2-mercaptobenzothiazole and the like; dithiocarbamates such as tellurium diethyldithiocarbamate, copper dimethyldithiocarbamate, bismuth dimethyldithiocarbamate, cadmium diethyldithiocarbamate, lead dimethyldithiocarbamate, zinc diethyldithiocarbamate, zinc dimethyldithiocarbamate and zinc dibutyldithiocarbamate (ZDBDC). In a preferred embodiment, the sulfur cure package comprises sulfur and two sulfur vulcanizing accelerators, namely MBTS and ZDBDC.

It should be appreciated that the foregoing list is not exclusive, and that other vulcanizing agents known in the art to be effective in the curing of EPDM terpolymers employed in the polymer blend may also be utilized. For a list of additional vulcanizing agents, see *The Vanderbilt Rubber Handbook,* RT Vanderbilt Co., Norwalk Conn. 06855 (1990). It should also be understood that these sulfur donor-type accelerators may be used in place of the elemental sulfur or in conjunction therewith. Suitable amounts of sulfur to be used in the cure package can be readily determined by those skilled in the art, and generally range from about 0.25 to 2.0 phr, while the amount of sulfur vulcanizing accelerator can also be readily determined by those skilled in the art and generally range from about 1.5 to about 10 phr, depending upon the amount of sulfur, the type of vulcanizing accelerators selected and the ultimate destination or use of the EPDM-based roofing shingle composition.

It will be appreciated that the sulfur and the sulfur vulcanizing accelerators may be added in amounts suitable for curing the roofing shingle compositions after it has been installed on the rooftop. Thus, when employed as a rooftop curable roofing shingle in a warm climate, different accelerators and/or amounts thereof, known to those skilled in the art, can be selected as compared to those accelerators to be used for rooftop curing in cooler climates.

In order to be rooftop curable, the roofing shingle composition is not fully cured prior to application and need not be cured subsequent thereto. The presence of the cure package allows the roofing shingle composition to cure at temperatures of at least about 50° C., readily obtainable when exposed to sunlight in most climates.

Accelerators generally require a metal oxide, i.e., zinc oxide for cure activation in most all types of rubbers. Zinc oxide is almost always the metal oxide of choice because of its effectiveness and lack of toxicity. The amount of zinc oxide may vary, but about 1 to about 10 parts, preferably 4 to 5 parts by weight per 100 part of EPDM terpolymer, in the formulation have been found to give the desired effect. Also, in order to initiate the vulcanization process, from about 1 to 2 parts of stearic acid by weight, per 100 parts of the EPDM terpolymer is present in the shingle composition. Using heat, both zinc oxide and stearic acid act as cure activators in the presence of sulfur, one or more sulfur vulcanizing accelerators and unsaturated EPDM polymer to help promote the formation of sulfur crosslinks during the vulcanization process. Some of the initial chemical reactions which take place during the early stages of the vulcanization process include reacting zinc oxide with stearic acid to form salts of even greater vulcanization activity. Zinc oxide itself acts as a cure activator or vulcanization promoter, speeding the rate of reaction of elemental sulfur with the unsaturation in the diene portion of the EPDM terpolymer. In addition to its use as a curing component, the sulfur component of the present invention may also be used in conjunction with zinc oxide to improve heat aging resistance of the roof shingle composition.

During the molding process, vulcanization temperatures as high as 210° C. are generally adequate to complete vulcanization in about 1 to 7 minutes. The vulcanization time can be further reduced by elevating the molding temperature during the vulcanization process. Roof shingles may be produced using either the compression or injection molding process.

Other ingredients may also be included in the roof shingle composition. For example, additional conventional rubber compounding additives such as antioxidants, antiozonants and the like may be included in conventional amounts typically ranging from about 0.50 to about 4 phr.

The compounding ingredients can be preferably admixed or compounded in a Brabenderg mixer or a type B internal mixer (such as a Banbury mixer), or any other mixer suitable for preparing viscous relatively uniform admixtures. When utilizing a type B Banbury internal mixer or a Brabender® mixer, in a preferred mode, the dry or powdery materials (e.g., carbon black, mineral filler, zinc oxide, stearic acid, fire retardant additives, etc.) are added into the mixing cavity first, followed by any liquid process oil or softeners (e.g., process oil, plasticizers, etc.) and finally, the polymeric components (e.g., EPDM, EPM, LDPE, HDPE, IPP, etc.) This type of mixing can be referred to as an upside-down mixing technique. The mixing time may vary from about 2.5 minutes to 5–6 minutes, depending on the melt characteristics of the polyethylene and polypropylene resins. The drop or dump temperature of the first-stage mix (masterbatch) is usually about 163° C. to 185° C. The masterbatch is refined and resheeted on a hot two-roll mix. The temperature of the mill rolls usually ranges from about 150° C. to about 170° C.

Within a matter of minutes, the resheeted slab stock is cut to the desired dimensions and added strip by strip to the cavity of the mixing chamber. After about 50 percent of the rubbery masterbatch has been added to the mixer, the cure package is discharged into the mixing chamber followed by the addition of the remainder of the masterbatch. The temperature of the rubbery mix is allowed to reach temperatures as high at about 300° F. (150° C.) for only a very short period of time (approximately 1.5 minutes or less). The second stage mix (final) is quickly resheeted to the desired dimensions again using a hot two-roll mill. The total mixing time involving the second stage mix (final) is usually no more than about two minutes. The freshly prepared fully compounded test specimens are press cured about 30 minutes at 320° F. (160° C.). Typical test properties performed include those tests which indicate stress-strain properties, tear resistance, ozone aging resistance, weathering resistance, Shore "A" hardness, water absorption, heat aging resistance and oxygen index measurements.

In order to demonstrate the practice of the present invention, several roofing shingle compositions prepared according to the concepts of the present invention were compounded in a Brabender® mixer using the above-described two-stage mixing technique. The dry or powdery materials (e.g., carbon black, mineral filler, zinc oxide, stearic acid, fire retardant additives, etc.) were charged into the mixing cavity first. Next, any process oil or softeners, e.g., process oil, plasticizers, etc., were added. Lastly, the elastomeric components, e.g., EPDM, EPM, LDPE, LLDPE, HDPE, IPP, etc.) were added to the cavity of the mixer.

The following examples are submitted for further illustrating the nature of the present invention and are not to be considered as a limitation of the scope thereof. Parts and percentages are by weight, unless otherwise indicated. The composition of each of the roofing shingle formulations prepared are shown in Tables I–III hereinbelow.

Table I is a comparison of virgin EPDM-based roof shingle compositions (control) and recycled EPDM-based roofing shingle material prepared from a composition of matter comprising: a polymer component, mineral fillers, processing aids, processing oil, cure activators, and other compounding additives. A sulfur/accelerator cure package was added to each roof shingle composition. While Compound No. 1 comprised 100 percent virgin EPDM terpolymer as the polymer component, Compound No. 2 comprised 100 percent recycled EPDM-based roof shingle compound which also featured 100 parts EPDM and 100 parts cryogenically ground EPDM (40 mesh) material, including uncured roof shingle edge trimmnings and cured flash trimmed from the edges of cured compression molded EPDM-based roofing shingles. The purpose of this compounding study was to determine if a recycled roof shingle compound (Compound No. 2) can be used to produce EPDM-based roof shingles which will have physical properties comparable to the compound (Compound No. 1) which contains EPDM polymer that has not been recycled. To the 100 parts of EPDM terpolymer of Compound Nos. 1 and 2, 150 parts by weight magnesium hydroxide, 50 parts by weight mica 150, 2.5 parts by weight processing aid, 135 parts by weight high density polyethylene, 100 parts by weight EPDM cryogrind (40 mesh), 50 parts by weight process oil, 7.5 parts by weight titanium dioxide, 4.0 parts by weight zinc oxide and 1.25 parts by weight stearic acid, was added to create a masterbatch. A sulfur/accelerator cure package comprising 1.0 part by weight of sulfur, 2.15 parts by weight of benzothiazyl disulfide (MBTS) accelerator and 1.40 parts by weight of zinc dibutyldithiocarbamate (ZDBDC). Each of the compounds were prepared utilizing standard polymer mixing techniques and equipment by mixing together the ingredients listed hereinabove.

In order to evaluate and compare the properties of the EPDM-based roofing shingles comprising either virgin Royalene EPDM (Compound No. 1) or uncured edge trimmings and cured flash trimmed from the edges of compression molded roof shingles (Compound No. 2) were prepared by compounding the EPDM terpolymers, thermoplastic modifying polymers, fillers, process oil and other additives in a type B Banbury internal mixer and resheeted using a hot two-roll mill as described hereinabove. The sulfur/accelerator cure package was added to the masterbatch in the Banbury mixer and again resheeted to the proper dimensions on a hot two-roll mill. The results of the various properties tested, including scorch time, time to 50% and 90% cure, compound viscosity, stress-strain properties, die-C tear resistance and Shore "A" hardness are reported in Table I.

TABLE I

Effect of Recycling on the Physical Property Performance of Roof Shingle Compositions

| | COMPOUND NOS. | |
|---|---|---|
| | 1 (Virgin Compound) | 2 (Recycled Compound) |
| Royalene EPDM | 100 | 100 |
| Magnesium Hydroxide | 150 | 150 |
| Mica | 50 | 50 |
| Processing Aid | 2.5 | 2.5 |
| HDPE | 135 | 135 |
| EPDM Cryogrind (40 Mesh) | 100 | 100 |
| Paraffinic Process Oil | 50 | 50 |
| Titanium Dioxide | 7.5 | 7.5 |
| Zinc Oxide (cure activator) | 4.0 | 4.0 |
| Stearic Acid | 1.25 | 1.25 |
| Masterbatch | 600.25 | 600.25 |
| Cure Package | | |
| Sulfur | 1.0 | 1.0 |
| MBTS accelerator | 2.15 | 2.15 |
| ZDBDC accelerator | 1.40 | 1.40 |
| TOTAL | 604.80 | 604.80 |
| Rheometer at 320° F. (160° C.) - mini-die, 3° arc | | |
| Scorch time, minutes | 4:53 | 3:31 |
| Time to 50% cure, minutes | 7:18 | 5:17 |
| Time to 90% cure, minutes | 13:50 | 12:18 |
| Minimum torque, lb.-inch | 9.2 | 10.6 |
| Maximum torque, lb.-inch | 21.2 | 23.7 |
| Mooney Scorch at 275° F. (135° C.) - large rotor | | |
| Minimum Viscosity, Mu | 44.5 | 46.4 |
| $T_5$, minutes | 18.3 | 15.7 |
| $T_{35}$, minutes | 33.7 | 32.3 |
| Stress-Strain Properties at 73° F. (23° C.) Unaged | | |
| 100% Modulus, psi | 525 | 705 |
| 300% Modulus, psi | 685 | 816 |
| Tensile at break, psi | 1000 | 930 |
| Elongation at break, % | 565 | 495 |
| Heat Aged for 28 Days at 240° F. (116° C.) | | |
| 100% Modulus, psi | 855 | 1050 |
| 300% Modulus, psi | 1210 | 1315 |
| Tensile at break, psi | 1318 | 1325 |
| Elongation at break, % | 365 | 305 |
| Die C Tear Properties at 73° F. (23° C.) Unaged | | |
| Lbs/inch | 267 | 288 |
| Heat Aged for 28 Days at 240° F. (116° C.) | | |
| Lbs/inch | 289 | 304 |
| Shore "A" Hardness | | |
| Unaged-Tested at 73° F. | 88 | 90 |
| (23° C.) Heat Aged for 28 Days at 240° F. (116° C.) | 89 | 91 |

The cure characteristics of the virgin and recycled EPDM-based roofing shingle compositions were determined by means of a Monsanto Oscillating Disc Rheometer (described in detail in American Society of Testing and Materials Standard, ASTM D-2084). The metal die used to measure the scorch time, cure rates and state of cure is referred to as a mini-die. During testing, the die oscillated at a 3° arc. According to the rheometer data shown in Table I, the recycled roof shingle composition (Compound No. 2) was directionally faster curing, relative to the virgin roof shingle composition. Both roof shingle compositions had similar cure states based on maximum torque results.

The test method (ASTM D 1646) covers the use of the shearing disc viscometer for measuring the Mooney Viscosity of raw polymers and fully compounded rubber composition. The viscosity of the fully compounded rubber compound during vulcanization can be detected with this instrument as evidenced by an increase in viscosity. Therefore, this test method can be used to determine incipient cure time and the rate of cure during very early stages of vulcanization. Based on Mooney Scorch data at 135° C., Compound Nos. 1 and 2 have similar compound viscosities and the compound featuring the recycled EPDM-based material was slightly faster curing based on time to five point rise. Based on Mooney Scorch at 135° C. data, the recycled roof shingle composition was characterized as a higher viscosity, slightly faster curing compound compared to the virgin roof shingle composition (Compound No. 1).

For testing stress-strain properties at 23° C., dumbbell-shaped specimens were cut using the appropriate metal die from individual cured 45 mil six by six-inch flat rubber slabs (compression molded 30 minutes at 160° C.) in accordance with ASTM D 412 (Method A—dumbbell and straight). Modulus (psi), tensile strength at break (psi) and elongation at break (%) measurements were obtained on unaged dumbbell-shaped test specimens using a table model Instron® Tester, Model 4301, and the test results were calculated in accordance with ASTM D 412. The Instron® Tester (a testing machine of the constant rate-of-jaw separation type) is equipped with suitable grips capable of clamping the test specimens without slippage. Unaged samples and samples heat aged for 28 days at 116° C. involving Compound Nos. 1 and 2 were tested. All dumbbell-shaped test specimens were allowed to set for about 24 hours, before testing at 20 inches per minute crosshead speed at 23° C. According to the stress-strain property data shown in Table I, the unaged sample of Compound No. 1 (virgin compound) has a 100% modulus (psi) of 525, a 300% modulus (psi) of 685, a tensile strength at break (psi) of 1000 and an elongation at break (%) of 565. The unaged sample of Compound No. 2 (featuring 100% recycled roof shingle compound) has a 100% modulus (psi) of 705, a 300% modulus (psi) of 816, a tensile strength at break (psi) of 930 and an elongation at break (%) of 495. The unaged stress-strain properties in Table 1 revealed that Compound Nos. 1 and 2 have similar stress-strain properties as measured at 23° C.

Heat aged samples of Compound Nos. 1 and 2 were also tested for their stress-strain properties at 23° C. According to the stress-strain property data shown in Table I, the heat aged sample of Compound No. 1 (virgin compound) has a 100% modulus (psi) of 855, a 300% modulus (psi) of 1210, a tensile strength at break (psi) of 1318 and an elongation at break (%) of 365. The heat aged sample of Compound No. 2 (featuring 100% recycled roof shingle compound) has a 100% modulus (psi) of 1050, a 300% modulus (psi) of 1315, a tensile at break (psi) of 1325 and an elongation at break (%) of 305. As shown from the data in Table I, the heat aged samples of Compound Nos. 1 and 2 have similar stress-strain properties as measured at 23° C.

Die C tear properties for unaged samples and samples heat aged for 28 days at 116° C. involving Compound Nos. 1 and 2 were determined by using a metal die (90° angle die C) to remove the test specimens from cured 45 mil six by six-inch flat rubber slabs (compression molded 30 minutes at 160° C.) in accordance with ASTM D 624. All die C tear test specimens, were allowed to set for about 24 hours, before testing was carried out at 23° C., as shown in Table I.

Tear properties, in lbs./inch, were obtained using a table model Instron® Tester, Model 4301 and the test results were calculated in accordance with ASTM Method D 624. As shown in Table I, unaged and heat aged samples of Compound Nos. 1 and 2 have similar die C tear properties.

Shore "A" hardness, which measures the hardness of the cured roofing shingle compound, was conducted at 23° C. in accordance with ASTM Method D 2240 for unaged and heat aged samples of Compound Nos. 1 and 2. The cured test specimens were allowed to set for about 24 hours prior to testing. As shown in Table I, unaged and heat aged samples of Compound Nos. 1 and 2 have very similar Shore "A" hardness values.

As can be seen from the data presented in Table I, the virgin compound and the compound prepared from 100% recycled EPDM-based roof shingle compositions, (Compound Nos. 1 and 2) exhibited similar stress-strain, die C tear and Shore "A" hardness properties both before and after heat aging 28 days at 116° C.

Based on the foregoing results in Table I with respect to cure characteristics, Mooney viscosity, stress-strain properties, die C tear properties and Shore "A" hardness properties, both the virgin EPDM-based compound and the 100% recycled EPDM-based roofing shingle compositions are suitable for the manufacture of roofing shingles used to cover high durometer sloped roofs.

Compound Nos. 3–6 in Table II provide examples of sulfur curable, colored, high durometer EPDM-based roofing shingle compositions of the present invention, and are submitted for the purpose of further illustrating the nature of the present invention.

TABLE II

Properties of Colored EPDM-Based Roof Shingle Compositions

| | COMPOUND NOS. | | | |
|---|---|---|---|---|
| | 3 | 4 | 5 | 6 |
| Royalene EPDM | 100 | 100 | 100 | 100 |
| Magnesium Hydroxide | 150 | 150 | 150 | 150 |
| Mica | 50 | 50 | 50 | 50 |
| Processing Aid | 2.50 | 2.50 | 2.50 | 2.50 |
| HDPE | 135 | 135 | 135 | 135 |
| EPDM Cryogrind (40 mesh) | 100 | — | — | — |
| EPDM Cryogrind (20 mesh) (red rubber dust) | — | 100 | — | — |
| EPDM Cryogrind (20 mesh) (green rubber dust) | — | — | 100 | — |
| EPDM Cryogrind (20 mesh) (tan rubber dust) | — | — | — | 100 |
| Paraffinic Process Oil | 50 | 50 | 50 | 50 |
| Titanium Dioxide | 7.50 | 7.50 | 7.50 | 7.50 |
| Zinc Oxide (cure activator) | 4.0 | 4.0 | 4.0 | 4.0 |
| Stearic Acid | 1.25 | 1.25 | 1.25 | 1.25 |
| Masterbatch | 600.25 | 600.25 | 600.25 | 600.25 |
| Cure Package | | | | |
| Sulfur | 1.0 | 1.0 | 1.0 | 1.0 |
| MBTS accelerator | 2.15 | 2.15 | 2.15 | 2.15 |
| ZDBDC accelerator | 1.40 | 1.40 | 1.40 | 1.40 |
| TOTAL | 604.80 | 604.80 | 604.80 | 604.80 |
| Rheometer at 320° F. (160° C.) - mini-die 3° arc | | | | |
| Scorch time, minutes | 4:53 | 5:05 | 4:39 | 4:56 |
| Time to 50% cure, minutes | 7:18 | 7:29 | 6:53 | 7:11 |
| Time to 90% cure, minutes | 13:50 | 13:43 | 12:57 | 13:36 |
| Minimum torque, lb.-inch | 9.2 | 8.7 | 9.1 | 9.0 |
| Maximum torque, lb.-inch | 21.2 | 19.9 | 20.8 | 20.7 |
| Mooney Scorch at 275° F. (135° C.) - large rotor | | | | |
| Minimum Viscosity, Mu | 44.5 | 42.9 | 45.7 | 45.1 |
| $T_5$, minutes | 18.3 | 17.8 | 17.5 | 18.7 |
| $T_{35}$, minutes | 33.7 | 32.8 | 33.1 | 34.3 |
| Stress-Strain Properties at 73° F. (23° C.) Unaged | | | | |
| 100% Modulus, psi | 525 | 845 | 885 | 865 |
| 300% Modulus, psi | 685 | 990 | 1080 | 1025 |
| Tensile at break, psi | 1000 | 1305 | 1465 | 1440 |
| Elongation at break, % | 565 | 512 | 520 | 550 |
| Heat Aged for 28 Days at 240° F. (116° C.) | | | | |
| 100% Modulus, psi | 855 | 1180 | 1130 | 1160 |
| 300% Modulus, psi | 1210 | 1860 | 1605 | 1750 |
| Tensile at break, psi | 1318 | 1999 | 1850 | 1788 |
| Elongation at break, % | 365 | 327 | 363 | 301 |
| Die C Tear Properties at 73° F. (23° C.) Unaged | | | | |
| Lbs/inch | 267 | 334 | 325 | 342 |
| Heat Aged for 28 Days at 240° F. (116° C.) | | | | |
| Lbs/inch | 289 | 316 | 318 | 314 |
| Shore "A" Hardness | | | | |
| Unaged-Tested at 73° F. (23° C.) | 88 | 90 | 91 | 90 |
| Heat Aged for 28 Days at 240° F. (116° C.) | 89 | 92 | 92 | 91 |

The examples illustrated in Table II (Compound Nos. 3–6) are sulfur curable, colored, EPDM-based roofing shingle compositions prepared from a composition of matter comprising: a polymer component, a thermoplastic modifying polymer, a colored EPDM rubber dust, mineral fillers, processing aid, processing oil, cure activator and other additives. A sulfur/accelerator cure package was added to the roofing shingle compositions of Table II. Compound Nos. 3–6 comprise a Royalene EPDM terpolymer as the polymer component of the roofing shingle composition. To the 100 parts of EPDM terpolymer of Compound Nos. 3–6, 150 parts by weight magnesium hydroxide, 50 parts by weight mica, 2.5 parts by weight processing aid, 135 parts by weight high density polyethylene, 50 parts by weight paraffinic process oil, 7.5 parts by weight titanium dioxide, 4.0 parts by weight zinc oxide and 1.25 parts by weight stearic acid. To Compound No. 3, 100 parts by weight EPDM cryogrind (40 mesh), per 100 parts of EPDM terpolymer was added to create the masterbatch. To Compound No. 4, 100 parts by weight EPDM cryogenically ground (20 mesh) red rubber dust, per 100 parts EPDM terpolymer was added to create the masterbatch. To Compound No. 5, 100 parts by weight EPDM cryogenically ground (20 mesh) green rubber dust, per 100 parts EPDM terpolymer was added to create the masterbatch. To Compound No. 6, 100 parts by weight EPDM cryogrind (20 mesh) tan rubber dust, per 100 parts of EPDM terpolymer was added to create the masterbatch. A sulfur/accelerator cure package comprising 1 part by weight sulfur, 2.15 parts by weight benzothiazyl disulfide (MBTS) accelerator and 1.40 parts by weight zinc dibutyldithiocarbamate (ZDBDC) were added to each of Compound Nos. 3–6. Each of the compounds were prepared utilizing standard rubber mixing techniques and equipment by mixing together the ingredients listed hereinabove.

In order to evaluate the properties of the colored, high durometer, EPDM-based roofing shingle compositions comprising Royalene EPDM terpolymer, Compound Nos. 3–6 were prepared by compounding the EPDM terpolymer, thermoplastic modifying polymers, EPDM colored rubber dust, mineral fillers, process oil and other additives in a type B Banbury internal mixer and resheeted on a hot tworoll mill as described hereinabove. The sulfur/accelerator package was added to the masterbatch in the Banbury mixer and again resheeted to the proper dimensions using a hot two-roll mill. The results of the various properties tested, including scorch time, time to cure, compound viscosity, stress-strain properties, die-C tear resistance and Shore "A" hardness are reported in Table II.

The cure characteristics of the control normal colored, i.e., dark gray or "slate-like" colored, and the uniquely colored EPDM-based roofing shingles were determined by means of a Monsanto Oscillating Disc Rheometer (described in detail in American Society of Testing and Materials Standard, ASTM D-2084). The metal die used to measure the scorch time, cure rates and state of cure is referred to as a mini-die. During actual testing, the die oscillated at a 3° arc according to the rheometer data shown in Table II. Differences in scorch time (time to two point rise), cure time and state of cure between the normal colored roof shingle (Compound No. 3) and uniquely colored roof shingle compositions featuring red, green and tan colored rubber dust (20 mesh) were minimal.

The test method (ASTM D 1646) covers the use of the shearing disc viscometer for measuring the Mooney Viscosity of raw polymers and fully compounded rubber composition. The viscosity of the fully compounded rubber composition during vulcanization can be detected with this instrument as evidenced by an increase in compound viscosity. Therefore, this test method can be used to determine incipient cure time and the rate of cure during very early stages of vulcanization. Based on Mooney Scorch data at 135° C., Compound Nos. 3–6 have similar viscosities and curing times. Based on the Mooney Scorch at 135° C., the colored rubber dust had essentially no influence on the compound viscosity and cure rate of the uniquely colored roof shingle compositions, relative to the normal colored roof shingle composition (Compound No. 3).

For testing stress-strain properties at 23° C., dumbbell-shaped test specimens were cut using the appropriate metal die from individual cured 45 mil six by six-inch flat rubber slabs (compression molded 30 minutes at 160° C.) in accordance with ASTM D 412 (Method A—dumbbell and straight). Modulus (psi) tensile strength at break (psi) and elongation at break (%) measurements were obtained on unaged dumbbell-shaped test specimens using a table model Instron& Tester, Model 4301, and the test results were calculated in accordance with ASTM D 412. The Instron® Tester (a testing machine of the constant rate-of-jaw separation type) is equipped with suitable grips capable of clamping the test specimens without slippage. Unaged samples and samples heat aged for 28 days at 116° C. of Compound Nos. 3–6 were tested. All unaged and heat-aged dumbbell-shaped test specimens were allowed to set for about 24 hours, before testing was carried out at a crosshead speed of 20 inches per minute at 23° C. According to the stress-strain property data shown in Table I, the unaged test samples of Compound No. 3 has a 100% modulus (psi) of 525, a 300% modulus (psi) of 685, a tensile strength at break (psi) of 1000 and an elongation at break (%) of 565. The unaged sample of Compound No. 4 has a 100% modulus (psi) of 845, a 300% modulus (psi) of 990, a tensile strength at break (psi) of 1305 and an elongation at break (%) of 512. The unaged sample of Compound No. 5 has a 100% modulus (psi) of 885, a 300% modulus (psi) of 1080, a tensile strength at break (psi) of 1465 and an elongation at break (%) of 520. Unaged sample of Compound No. 6 has a 100% modulus (psi) of 865, a 300% modulus (psi) of 1025, a tensile strength at break (psi) of 1440 and an elongation at break (%) of 550. As shown from the stress-strain data in Table II, the unaged dumbbell-shaped test samples of Compound Nos. 3–6 have similar stress-strain properties as measured at 23° C.

Heat aged dumbbell-shaped test samples of Compound Nos. 3–6 were also tested for their stress-strain properties at 23° C. According to the stress-strain property data shown in Table II, the heat aged sample of Compound No. 3 has a 100% modulus (psi) of 855, a 300% modulus (psi) of 1210, a tensile strength at break (psi) of 1318 and an elongation at break (%) of 365. The heat aged sample of Compound No. 4 has a 100% modulus (psi) of 1180, a 300% modulus (psi) of 1860, a tensile strength at break (psi) of 1999 and an elongation at break (%) of 327. The heat aged sample of Compound No. 5 has a 100% modulus (psi) of 1130, a 300% modulus (psi) of 1605, a tensile strength at break (psi) of 1850 and an elongation at break (%) of 301. The heat aged sample of Compound No. 6 has a 100% modulus (psi) of 1160, a 300% modulus (psi) of 1750, a tensile strength at break (psi) of 1788 and an elongation at break (%) of 301. As shown from the stress-strain data in Table II, the heat aged samples of Compound Nos. 3–6 have similar stress-strain properties as measured at 23° C. These roof shingle compositions showed excellent resistance to heat aging, based on the properties provided in Table II.

Die C tear properties for unaged samples and samples heat aged for 28 days at 116° C. were determined by using a metal die (90° angle die C) to remove the test specimens from cured 45 mil six by six-inch flat rubber slabs (compression molded 30 minutes at 160° C.) in accordance with ASTM D 624. All die C tear specimens, were allowed to set for about 24 hours, before testing was carried out at 23° C., as shown in Table II.

Tear properties, in lbs./inch, were obtained using a table model Instron® Tester, Model 4301 and the test results were calculated in accordance with ASTM Method D624. The unaged test samples of Compound Nos. 3–6 have die C tear values at 23° C. of 267, 334, 325 and 342 lbs./inch, respectively. The heat aged samples of Compound Nos. 3–6 have a die C tear values at 23° C. of 289, 316, 318 and 314 lbs./inch, respectively. As shown in Table II, the unaged and heat aged samples of Compound Nos. 3–6 have similar die C tear properties. Again, the roof shingle compositions featuring the colored rubber dust (20 mesh) had excellent heat aging resistance.

Shore "A" hardness, which measures the hardness of the cured roofing shingle composition, was conducted at 23° C. in accordance with ASTM Method D 2240 for unaged and heat aged samples of Compound Nos. 3–6. The cured test specimens were allowed to set for about 24 hours prior to testing. The unaged samples of Compound Nos. 3–6 have Shore "A" hardness values at 23° C. of 88, 90, 91 and 90, respectively.

The heat aged samples of Compound Nos. 3–6 have Shore "A" hardness values at 23° C. of 89, 92, 92 and 91, respectively. As shown in Table II, the unaged and heat aged samples of Compound Nos. 3–6 have very similar Shore "A" hardnesses.

As can be seen from the data presented in Table II, colored, high durometer, EPDM-based polymer roofing compositions, (Compound Nos. 3–6) exhibit similar cure, compound viscosity, stress-strain, die C tear, and Shore "A" hardness properties as compared to the control (normal colored) roofing shingle composition (Compound No. 3). The compositions featuring the colored EPDM rubber dust demonstrated excellent retention of heat aged properties after aging 28 days at 116° C. Also, changes in cured compound durometer were minimal. For example, only 1 to 2 point changes in durometer readings were reported when comprising the unaged and heat aged test samples shown in Table II.

As can be seen from the data presented in Table II, Compound Nos. 3–6 exhibit similar cure characteristics (i.e. scorch time, time to 50% cure and time to 90% cure), stress-strain properties, die C tear properties, and Shore "A" hardnesses. For these reasons, the EPDM-based roof shingle compositions, as shown in Table II (Compound Nos. 3–6), are suitable for use as colored, high durometer EPDM-based roofing shingle compositions for sloped roofs.

Compound Nos. 7–10 in Table III provide examples of sulfur curable, fiber-reinforced, high durmoeter EPDM-based roofing shingle compositions of the present invention, and are submitted for the purpose of further illustrating the nature of the present invention.

TABLE III

Properties of Glass Fiber-Reinforced EPDM-Based Roof Shingle Compositions

| | COMPOUND NOS. | | | |
|---|---|---|---|---|
| | 7 | 8 | 9 | 10 |
| Royalene EPDM | 100 | 100 | 100 | 100 |
| Magnesium Hydroxide | 150 | 150 | 150 | 150 |
| Mica | 50 | 50 | 50 | 50 |
| Processing Aid | 2.5 | 2.5 | 2.5 | 2.5 |
| Paraffinic Process Oil | 50 | 50 | 50 | 50 |
| Titanium Dioxide | 7.5 | 7.5 | 7.5 | 7.5 |
| Zinc Oxide (cure activator) | 4.0 | 4.0 | 4.0 | 4.0 |
| Stearic Acid | 1.25 | 1.25 | 1.25 | 1.25 |
| HDPE | 135 | 135 | 135 | 135 |
| EPDM Cryogrind (40 mesh) | 100 | 100 | 100 | 100 |
| Fiberglass 144A–14C | — | 10 | — | — |
| Fiberglass 408A–14C | — | — | 10 | — |
| Fiberglass 415A–14C | — | — | — | 10 |

TABLE III-continued

Properties of Glass Fiber-Reinforced EPDM-Based Roof Shingle Compositions

| | COMPOUND NOS. | | | |
|---|---|---|---|---|
| | 7 | 8 | 9 | 10 |
| Masterbatch | 600.25 | 600.25 | 600.25 | 600.25 |
| Cure Package | | | | |
| Sulfur | 1.0 | 1.0 | 1.0 | 1.0 |
| MBTS accelerator | 2.15 | 2.15 | 2.15 | 2.15 |
| ZDBDC accelerator | 1.40 | 1.40 | 1.40 | 1.40 |
| TOTAL | 604.80 | 604.80 | 604.80 | 604.80 |
| Rheometer at 320° F. (160° C.), mini-die, 3° arc | | | | |
| Scorch time, minutes | 4:53 | 4:42 | 4:37 | 4:39 |
| Time to 50% cure, minutes | 7:18 | 7:02 | 6:48 | 7:07 |
| Time to 90% cure, minutes | 13:50 | 13:11 | 12:57 | 13:38 |
| Minimum torque, lb.-inch | 9.2 | 10.1 | 9.9 | 9.3 |
| Maximum torque, lb.-inch | 21.2 | 20.8 | 21.4 | 21.5 |
| Mooney Scorch at 275° F. (135° C.) - large rotor | | | | |
| Minimum Viscosity, Mu | 44.5 | 45.1 | 46.0 | 45.4 |
| $T_5$, minutes | 18.5 | 17.6 | 18.1 | 18.3 |
| $T_{35}$, minutes | 33.7 | 32.8 | 33.1 | 33.7 |
| Stress-Strain Properties at 73° F. (23° C.) Unaged | | | | |
| 100% Modulus, psi | 525 | 745 | 875 | 765 |
| 300% Modulus, psi | 685 | 845 | 920 | 900 |
| Tensile at break, psi | 1000 | 1023 | 1115 | 1120 |
| Elongation at break, % | 565 | 497 | 484 | 500 |
| Heat Aged for 28 Days at 240° F. (116° C.) | | | | |
| 100% Modulus, psi | 855 | 1088 | 1080 | 1075 |
| 300% Modulus, psi | 1210 | 1360 | 1430 | 1195 |
| Tensile at break, psi | 1318 | 1385 | 1505 | 1440 |
| Elongation at break, % | 365 | 315 | 340 | 320 |
| Die C Tear Properties at 73° F. (23° C.) Unaged | | | | |
| Lbs/inch | 267 | 316 | 306 | 311 |
| Heat Aged for 28 Days at 240° F. (116° C.) | | | | |
| Lbs/inch | 289 | 313 | 320 | 320 |
| Shore "A" Hardness | | | | |
| Unaged-Tested at 73° F. (23° C.) | 88 | 91 | 89 | 91 |
| Heat Aged for 28 Days at 240° F. (116° C.) | 89 | 89 | 89 | 89 |
| Bending Modulus (according to ASTM D 747) | | | | |
| Sample #1 (force in psi × $10^5$) | 1.31 | 3.11 | 2.16 | 1.55 |
| Sample #2 (force in psi × $10^5$) | 1.49 | 2.87 | 2.49 | 1.96 |
| Average Force (force in psi × $10^5$) | 1.40 | 2.99 | 2.33 | 1.76 |

The examples illustrated in Table III (Compound Nos. 7–10) are sulfur curable, glass fiber-reinforced, high durometer, EPDM-based roofing shingle compositions prepared from a composition of matter comprising: a polymer component, a thermoplastic modifying polymer, reinforcing glass fibers, mineral fillers, processing aids, processing oil, cure activators and other additives. A sulfur cure package was added to the roofing shingle compositions of Table III. Compound Nos. 7–10 comprise Royalene EPDM terpolymer as the polymer component of the roofing shingle composition. To the 100 parts of EPDM terpolymer of Compound Nos. 7–10, 150 parts by weight magnesium hydroxide, 50 parts by weight mica, 2.5 parts by weight paraffinic processing aid, 135 parts by weight high density polyethylene, 100 parts by weight EPDM cryogrind (40 mesh) per 100 parts EPDM terpolymer, 50 parts by weight Sunpar 2280 process oil, 7.5 parts by weight titanium dioxide, 4.0 parts by weight zinc oxide and 1.25 parts by weight stearic acid. To Compound No. 8, 10 parts by weight of chopped fiberglass 144A–14C per 100 parts of EPDM terpolymer was added to create the masterbatch. To Compound No. 9, 10 parts by weight chopped fiberglass 408A–14C, per 100 parts of EPDM terpolymer was added to create the masterbatch. To Compound No. 10, 10 parts by weight chopped fiberglass 415A–14C, per 100 parts of EPDM terpolymer was added to create the masterbatch. A sulfur cure package comprising 1.0 part by weight sulfur, 2.15 parts by weight benzothiazyl disulfide (MBTS) accelerator and 1.40 parts by weight zinc dibutyldithiocarbamate (ZDBDC) was added to each of Compound Nos. 7–10. Each of the compounds were prepared utilizing standard polymer mixing techniques and equipment by mixing together the ingredients listed hereinabove.

In order to evaluate the properties of the glass fiber-reinforced, high durometer, EPDM-based roofing shingle compositions comprising Royalene EPDM terpolymer, Compound Nos. 7–10 were prepared by compounding the EPDM terpolymers, thermoplastic modifying polymers, reinforcing glass fibers, mineral fillers, process oil and other additives in a type B Banbury internal mixer and resheeted using a hot two-roll mill as described hereinabove. The sulfur/accelerator cure package was added to the masterbatch in the Banbury mixer and again resheeted to the proper dimensions on a hot two-roll mill. The results of the various physical properties tested, including stress-strain properties, die-C tear resistance Shore "A" hardness and bending modulus are reported in Table mi.

The cure characteristics of Compound No. 7 (control) without any chopped glass fiber and Compound Nos. 8–10 each with 10 parts chopped glass fiber per 100 parts EPDM terpolymer were determined by means of a Monsanto Oscillating Disc Rheometer (described in detail in American Society of Testing and Materials Standard, ASTM D 2084). A mini-die was used to measure the scorch time, cure rates and state of cure. During actual testing, the metal die oscillated at a 3° arc. According to the rheometer data shown in Table III, incorporation of chopped glass fiber had virtually no influence on scorch time (time to two point rise), time to 50% and 90% cure and the overall state of cure.

Test method (ASTM D 1646) covers the use of the shearing disc viscometer for measuring the Mooney Viscosity of raw polymer and fully compounded rubber composition. The viscosity of the fully compounded rubber compound during vulcanization can be detected with this instrument as evidenced by an increase in Acompound viscosity. Therefore, this test method can be used to determine incipient cure time and the rate of cure during very early stages of vulcanization. Based on Mooney scorch at 135° C. data, addition of the chopped glass fiber in the roofing shingle compositions had only minimal effect on compound viscosity and processing safety (scorch safety).

For testing stress-strain properties at 23° C., dumbbell-shaped specimens were cut using the appropriate metal die from individual cured 45 mil six by six-inch flat rubber slabs (compression molded 30 minutes at 160° C.) in accordance with ASTM D 412 (Method A—dumbbell and straight). Modulus (psi) tensile strength at break (psi) and elongation at break (%) measurements were obtained on unaged dumbbell-shaped test specimens using a table model InstronP Tester, Model 4301, and the test results were calculated in accordance with ASTM D 412. The Instron® Tester (a testing machine of the constant rate-of-jaw separation type) is equipped with suitable grips capable of clamping the test specimens without slippage. Unaged test samples and test samples heat aged for 28 days at 116° C. of Compound Nos. 7–10 were tested. All dumbbell-shaped specimens were allowed to set for about 24 hours, before testing was carried out at 23° C. According to the stress-strain property data shown in Table III, the unaged test sample of Compound No. 7 (control) has a 100% modulus (psi) of 525, a 300% modulus (psi) of 685, a tensile strength at break (psi) of 1000 and an elongation at break (%) of 565. The unaged test sample of Compound No. 8 has a 100% modulus (psi) of 745, a 300% modulus (psi) of 845, a tensile strength at break (psi) of 1023 and an elongation at break (%) of 497. The unaged test sample of Compound No. 9 has a 100% modulus (psi) of 875, a 300% modulus (psi) of 920, a tensile strength at break (psi) of 1115 and an elongation at break (%) of 484. The unaged test sample of Compound No. 10 has a 100% modulus (psi) of 765, a 300% modulus (psi) of 900, a tensile strength at break (psi) of 1120 and an elongation at break (%) of 500. As shown from the results in Table III, the unaged test samples of Compound Nos. 7–10 have similar stress-strain properties as measured at 23° C.

Heat aged samples of Compound Nos. 7–10 were also tested for their stress-strain properties at 23° C. According to the stress-strain property data shown in Table III, the heat aged sample of Compound No. 7 (control) has a 100% modulus (psi) of 855, a 300% modulus (psi) of 1210, a tensile strength at break (psi) of 1318 and an elongation at break (%) of 365. The heat aged sample of Compound No. 8 has a 100% modulus (psi) of 1088, a 300% modulus (psi) of 1360, a tensile strength at break (psi) of 1385 and an elongation at break (%) of 315. The heat aged sample of Compound No. 9 has a 100% modulus (psi) of 1080, a 300% modulus (psi) of 1430, a tensile strength at break (psi) of 1505 and an elongation at break (%) of 340. The heat aged sample of Compound No. 10 has a 100% modulus (psi) of 1075, a 300% modulus (psi) of 1195, a tensile strength at break (psi) of 1440 and an elongation at break (%) of 320. As shown from the data in Table III, the heat aged samples of Compound Nos. 7–10 have similar stress-strain properties as measured at 23° C. Modest increases in tensile strength were measured after heat aging the test samples for 28 days at 116° C.

Die C tear properties for unaged and samples heat aged for 28 days at 116° C. were determined by using a metal die (90° angle die C) to remove the test specimens from cured 45 mil six by six-inch flat rubber slabs (compression molded 30 minutes at 160° C.) in accordance with ASTM D 624. All die C tear specimens, were allowed to set for about 24 hours, before testing was carried out at 23° C., as shown in Table III.

Tear properties, in lbs./inch, were obtained using a table model InstronO Tester, Model 4301 and the test results were calculated in accordance with ASTM Method D624. The unaged test samples of Compound Nos. 7–10 have a die C tear value at 23° C. of 276, 316, 306 and 311 lbs./inch, respectively. The heat aged samples of Compound Nos. 7–10 have die C tear values at 23° C. of 289, 313, 320, and 320 lbs./inch, respectively. As shown in Table III, the unaged and heat aged samples of Compound Nos. 7–10 have similar die C tear properties. Again, all test samples demonstrated excellent heat aging resistance.

Shore "A" hardness, which measures the hardness of the cured roofing shingle composition, was conducted at 23° C. in accordance with ASTM Method D 2240 for unaged and heat aged samples of Compound Nos. 7–10. The cured test specimens were allowed to set for about 24 hours prior to testing. The unaged samples of Compound Nos. 7–10 have Shore "A" hardness values at 23° C. of 88, 91, 89 and 91, respectively. Each of the heat aged samples of Compound Nos. 7–10 have Shore "A" hardness readings at 23° C. of 89. As shown in Table III, the unaged and heat aged samples of Compound Nos. 7–10 have very similar Shore "A" hardnesses values.

The American Society of Testing and Materials Standard test method D 747 measures the relative bending modulus (stiffnless) of materials. The above values represent the force (in psi) required to bend each cured 45 mil test sample. Test specimen width can be between 5 and 25.4 mm (0.25 and 1.0 inch). Minimum specimen thickness was measured to the nearest 0.025 mm (0.001 inch). This test is desirable for testing the bending modules of semi-rigid materials. All numbers shown in Table III are in psi×$10^5$.

The samples of chopped glass fiber reinforcement listed in Table III are all four millimeters in length and have a filament diameter of 14 microns. These materials are all commercially available from Owens Corning.

These materials (Compound Nos. 7–10) showed excellent ozone aging resistance. For example, when tested under 50% strain in the bent loop configuration and exposed to 100 PPHM ozone for as long as 600 hours at 40° C. no cracking or crazing was observed on the exposed surface of the cured roof shingle compositions. These materials also showed excellent low temperature properties. For instance, the brittle point for Compound No. 7 was determine to be −56.2° C. (−69.2° F.).

As can be seen from the data presented in Table III, glass fiber-reinforced, high durometer, EPDM-based roofing shingle compositions, (Compound Nos. 7–10) exhibit similar stress-strain, die C tear, Shore "A" hardness and bending modulus properties.

Based on the foregoing results in Table III with respect to cure characteristics, compound viscosity, stress-strain properties, die C tear properties and Shore "A" hardnesses, the high durometer EPDM-based roofing shingle compositions listed in Table III are suitable for the manufacture of slatelike and colored, fiber-reinforced, high durometer, EPDM-based roofing shingles for covering sloped roofs. Incorporation of 10 parts of chopped glass fiber did increase the stiffness of the roof shingle composition as seen in the bending modulus data shown in Table III. Also, the presence of 10 parts chopped glass fiber did not have a negative influence on any of the unaged and heat aged physical properties.

Based on the foregoing disclosure, it should now be apparent that the use of the roofing shingle compositions described herein will carry out the objects set forth hereinabove. It is, therefore, to be understood that any variations evident fall within the scope of the claimed invention and thus, the selection of specific component elements can be determined without departing from the spirit of the invention herein disclosed and described. In particular, it will be understood that the polymer compositions exemplified herein according to the present invention are not necessarily limited to those having EPDM terpolymers of the preferred embodiments. Moreover, at noted, hereinabove, other fillers or mixtures thereof and processing oils might be substituted for the specific fillers and oils exemplified hereinabove, and other ingredients may be optionally employed. Thus, the scope of the invention shall include all modifications and variations that may fall within the scope of the attached claims.

We claim:

1. A roofing shingle composition comprising:

100 parts by weight of at least one ethylene-propylene-diene (EPDM) terpolymer;

about 20 to about 135 parts by weight of at least one thermoplastic modifying polymer, per 100 parts by weight terpolymer;

from about 25 to about 400 parts by weight of at least one non-combustible filler, per 100 parts by weight terpolymer;

from 0 to about 125 parts by weight of at least one combustible filler, per 100 parts by weight terpolymer;

from 1 to about 10 parts by weight of reinforcing fibers, per 100 parts by weight terpolymer;

from about 20 to about 75 parts by weight of a process oil, per 100 parts by weight terpolymer; and from about 1 to about 6 parts by weight of a sulfur/accelerator cure package, per 100 parts by weight terpolymer.

2. The roofing shingle composition according to claim 1, wherein said composition further comprises up to about 150 parts by weight of a colored ethylene-propylene-diene rubber dust, per 100 parts by weight terpolymer.

3. The roofing shingle composition according to claim 1, wherein the ethylene2 propylene-diene terpolymer is an amorphous EPDM having less than 1.5 percent crystallinity.

4. The roofing shingle composition according to claim 1, wherein the ethylenepropylene-diene terpolymer has an ethylene content of at least about 65 weight percent.

5. The roofing shingle composition according to claim 1, wherein said roofing shingle composition comprises 100 percent recycled material of which EPDM is the major polymeric component.

6. The roofing shingle composition according to claim 1, wherein said at least one thermoplastic modifing polymer is selected from the group consisting of linear low density polyethylene (LDPE), high density polyethylene (HDPE), linear low density polypropylene (LLDPE), high density polypropylene (H1DPP), and isotactic propylene (IPP).

7. The roofing shingle composition according to claim 1, wherein said reinforcing fibers are chopped fibers selected from the group consisting of fiberglass, polyester, polyamide, polyolefin, and mixtures thereof.

8. The roofing shingle composition according to claim 1, wherein said noncombustible fillers are mineral fillers selected from the group consisting of clays, mica, talc, alumina trihydrate, antimony trioxide, calcium carbonate, titanium dioxide, silica, magnesium hydroxide, calcium borate ore, slate dust, and mixtures thereof.

9. The roofing shingle composition according to claim 1, wherein said process oil is selected from the group consisting of paraffinic oils, naphthenic oils, liquid halogenated paraffins and wax.

10. The roofing shingle composition according to claim 1, wherein said combustible fillers include up to about 125 parts of a finely ground filler selected from the group consisting of cryogenically or ambiently ground scrap rubber, of which EPDM is the major polymeric component.

11. The roofing shingle composition according to claim 1, wherein said sulfurfaccelerator cure package comprises 1 part by weight sulfur, 2.15 parts by weight benzothiazyl disulfide (MBTS) accelerator and 1.4 parts by weight zinc dibutyldithiocarbamate (ZDBDC) accelerator.

* * * * *